April 28, 1942. E. W. DUNCAN Re. 22,082
DROP BOTTOM CAR
Original Filed April 26, 1938 2 Sheets-Sheet 1
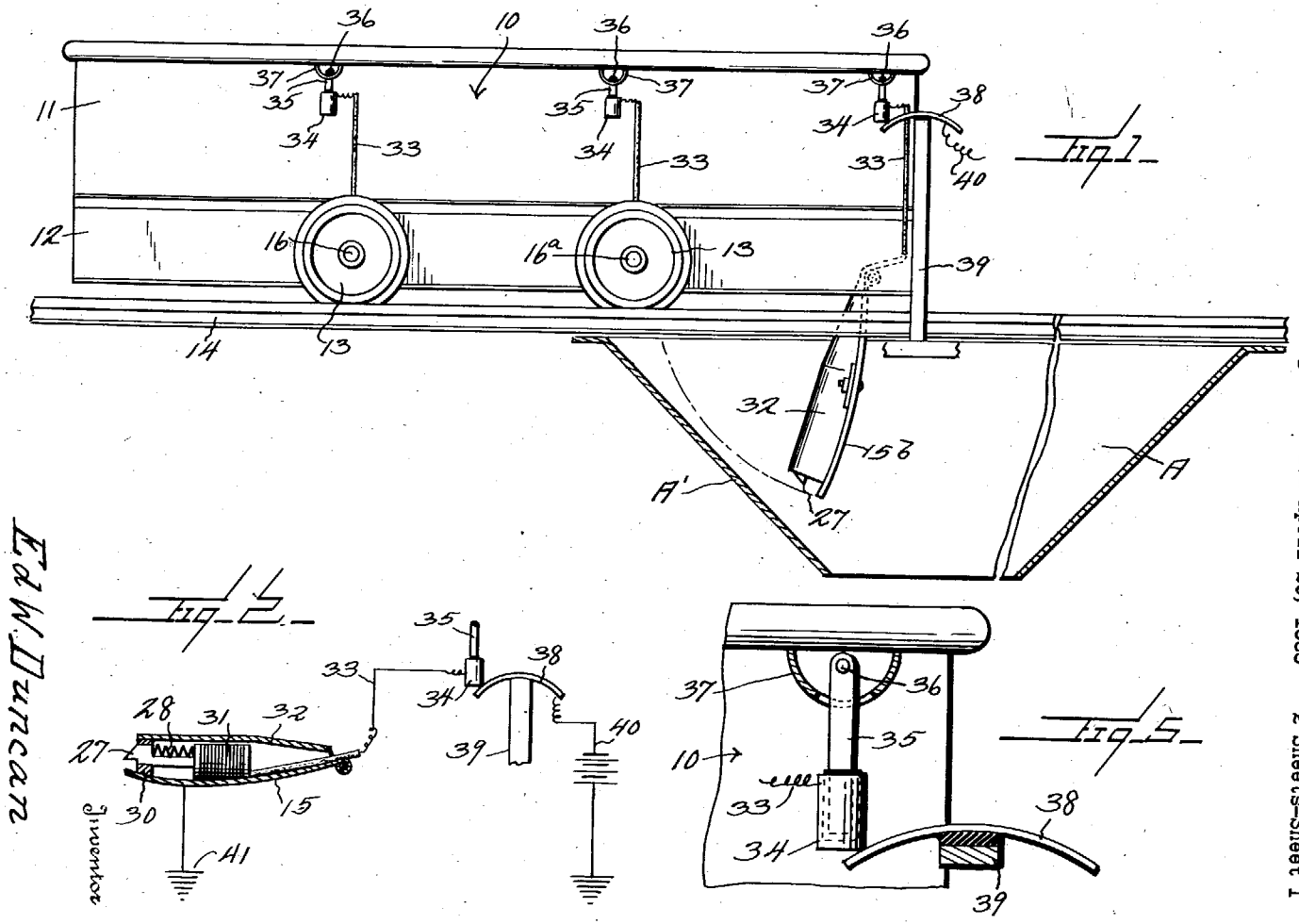

April 28, 1942. E. W. DUNCAN Re. 22,082

DROP BOTTOM CAR

Original Filed April 26, 1938 2 Sheets-Sheet 2

Inventor

Ed W. Duncan

By Watson E. Coleman

Attorney

Reissued Apr. 28, 1942

Re. 22,082

UNITED STATES PATENT OFFICE 22,082

DROP BOTTOM CAR

Ed W. Duncan, Blue Diamond, Ky.

Original No. 2,138,695, dated November 29, 1938, Serial No. 204,455, April 26, 1938. Application for reissue November 29, 1940, Serial No. 367,792

7 Claims. (Cl. 105—286)

This invention relates to railway cars for use in carrying coal, ore and other material which may be discharged thru the bottom of the car, and particularly relates to a car of this character having drop bottoms or doors normally held closed but released in order to discharge the contents of the car.

The primary object of the present invention is to provide an electro-magnetically operated latch for the control of gravity opened doors for vehicles and a novel means for controlling the energization of the latch magnet.

Still another object of the invention is to provide a vehicle having gravity opened doors for the discharge of lading, with an electrically controlled latch for securing said doors, together with a novel means whereby the latch control means for the doors may be selectively energized for the purpose of releasing said doors at a predetermined station.

Another object of the present invention is to provide a structure of this character in which the doors or drop bottoms are held up in closed position by a latch, and provide means whereby the latch may be electrically released when the car reaches a predetermined point, as for example, a predetermined point over a dump.

Another object is to provide a structure of this character in which the several drop bottoms or doors are serially released immediately that the car moves over the dump so that the first door is released when in proper position with relation to the dump, then as the car moves further on, the second door is released and discharges its load, etc.

A further object is to provide a structure of this character in which the doors may be released when any particular door is immediately above a downwardly inclined chute or floor, so that the coal or other material has only a little distance to fall instead of the coal or other material having to fall thru a relatively long distance to the bottom of the dump with consequent liability of the coal or other material being broken up into smaller pieces.

Other objects will appear in the course of the following description.

My invention is illustrated in the accompanying drawings wherein

Figure 1 is a side elevation of a drop bottom mining car with one of the doors dropped, the walls of the bin being shown in section.

Fig. 2 is an electrical diagram showing the electrical connections between the magnet, the contacts and the source of current.

Fig. 5 is an enlarged view of the contact member and of the third rail with which it is adapted to engage, the housing for the upper portion of the contact member being in section.

Figures 3, 4:
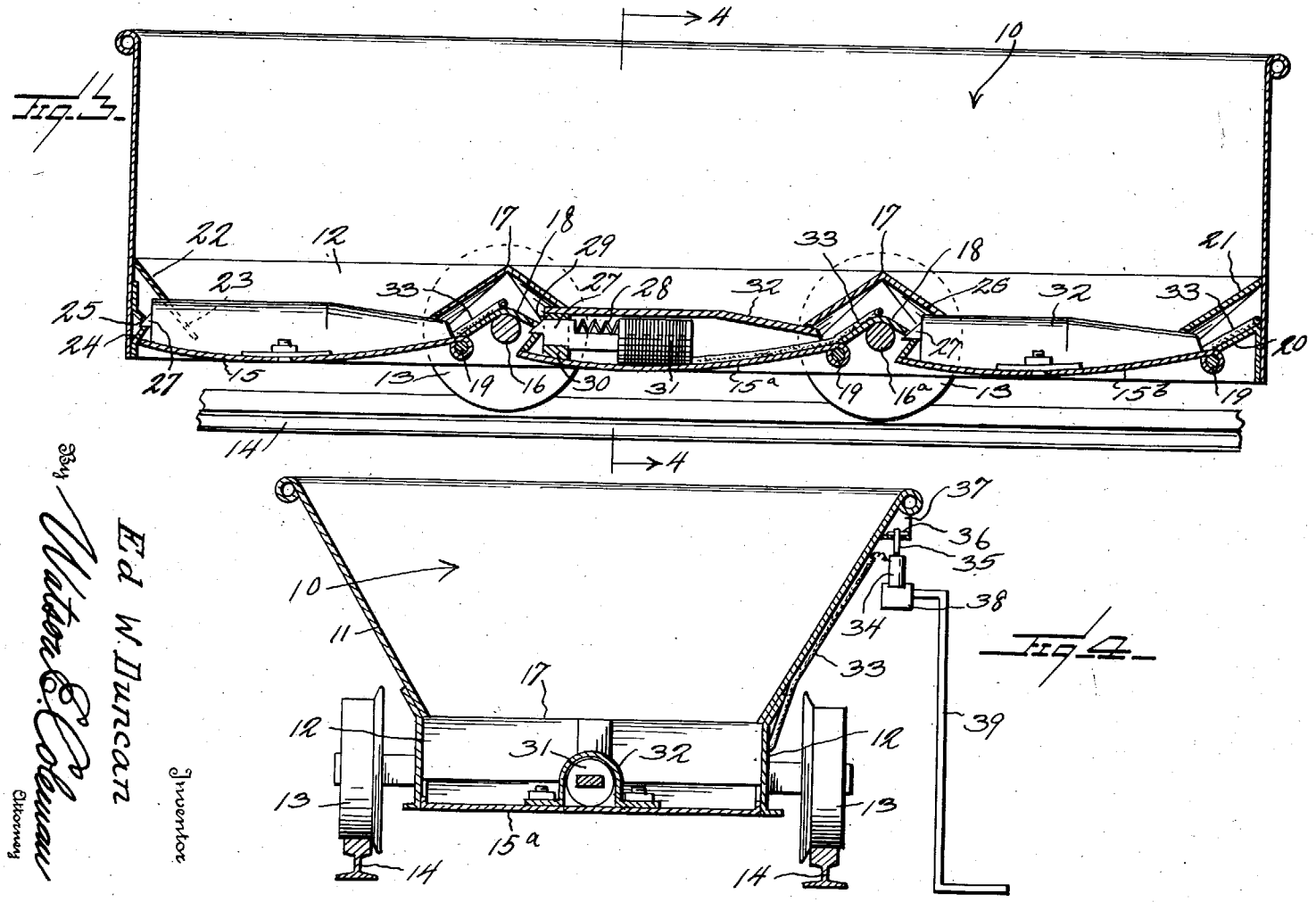
Fig. 3 is a longitudinal section of the car shown in Fig. 1, housing for one of the magnets and latches being broken away.
Fig. 4 is a section on the line 4—4 of Fig. 3.

Referring to the drawings, 10 designates generally the body of the car which may be constructed of metal or other suitable material and has sides 11 which extend downward and inward and then extend straight downward, as at 12. This car is provided with the usual wheels 13 operating on the rails 14 which extend across the dump A.

I have shown the car 10 as being provided with three drop bottoms designated generally 15. The forward bottom is hinged at its rear end adjacent to the front axle 16 of the car, the middle bottom or door 15a is hinged adjacent the rear axle but forward thereof, while the rearmost door 15b is hinged at its rear end adjacent the rear end of the car.

Above each of the axles there is disposed a protector or guard plate 17 of heavy sheet metal which is attached at its ends to the downwardly extending side walls 12 of the car body. Also disposed between each axle 16 or 16a and the guard plate 17 is a second approximately V-shaped plate 18.

The fore-door 15 is hinged at 19 to the forward edge of this intermediate plate 18, and the door 15a is also hinged at 19 to the corresponding intermediate plate 18. The door 15b is hinged at 19 to a plate 20, and extending over this plate 20 and downward and forward nearly to the hinge is a protector plate 21.

Extending downward and rearward at the front end of the portion 12 of the car is a plate 22 cut away at 23. Attached to the end of the portion 12 of the car is a keeper 24 having an indented portion 25. The plate 18 over the axle 16 is also formed upon its rear face with an indented keeper 25 and the same is true of the plate 18 which extends over the axle 16a. Each of the protector plates 17 are outwardly bulged on each edge of the middle thereof, as at 26.

Mounted upon the inner face of each door is a latch 27 which is projected by a spring 28 and which is guided within the guides 29 and 30 attached to the inner face of the door. The latch is projected by the spring 28 but is adapted to be retracted by the electro-magnet 31. The electro-magnet and the body of the latch are disposed within a housing 32 which is open at its forward end and is detachably carried upon the door, the rear end of this housing being somewhat tapered for the passage of an electric conductor 33 which is suitably insulated and extends laterally out thru the side wall of the car and then upward and forward to a contact 34. The nose of each latch 27 is adapted to engage with the corresponding keeper 25 and hold the door closed until the electro-magnet is energized whereupon, of course, the latch is released from the keeper and the door will fall, by reason of the weight of material thereon, or thru its own weight.

I have illustrated three contacts 34, one for each door. These contacts are each carried by a shank 35 having a T-shaped head 36 supported for rocking movement in an approximately U-shaped bracket 37. This construction or arrangement of the contacts 34 permits a certain amount of flexibility of the contact and shank and as will be seen upon reference to Fig. 5, when the contact engages the conductor rail 38 it will ride upwardly thereon and it will also be permitted a limited amount of oscillation or swinging movement so as to permit it to pass easily over the high point of the rail. This rail is mounted upon and insulated from a support 39, the location of this support and rail with respect to a receiver for the material or lading of the car being an important feature of the invention.

A conductor 40 leads from a source of electrical potential to this rail 38 and when a contact 34 engages this rail, the corresponding magnet is immediately energized, thus releasing the latch and causing the door to drop. The magnet 31 is electrically connected on one side to a ground 41 having metallic connection to the car frame, axle, or other part, and the other side of the magnet is connected by the conductor 33 as previously explained, to the contact 34.

The bin A is illustrated as having an upwardly inclined side wall A′ and preferably the third rail 38 will be so disposed that when the fore-door is just over this inclined wall A′, this door will be automatically opened, so that the coal is discharged upon this inclined wall A′ and thus has only a short distance to fall and will not be broken in its fall, but the coal will roll down the incline to the bottom of the bin. If the door opened above the middle portion of the bin A, the coal would have a long distance to fall and would be broken into relatively small pieces and its value reduced. When all the coal has been discharged from the front portion of the car, the car is again moved until the second or intermediate door is over the inclined portion A′ of the bin and then this intermediate door is automatically opened to discharge the coal thereover and then, of course, the rear door is successively opened.

It will be apparent from the foregoing that the conductor rail 38 will be disengaged from each contact 34 after the gravity controlled door has dropped to its fully opened position so that the lading may be discharged into the bin A and, therefore, the door may be immediately returned in a suitable manner to closed position and the latch will be free to re-engage the keeper with which it is associated.

While I have illustrated a car with three drop bottoms or doors, I do not wish to be limited thereto as obviously a greater number of drop bottoms might be used, depending upon the length of the car. It will be seen that the magnets and the latches are fully protected by the housings 32 and that the keepers and the axles are fully protected by the protecting plates 17 and that when the doors are closed, the projected latches engaging the several keepers are protected by the bulges 26.

While I have illustrated certain details of construction and arrangement of parts, it is obvious that many minor changes might be made therein without departing from the spirit of the invention as defined in the appended claims.

I claim:

1. In a vehicle having a lading discharge opening and a downwardly opening door pivotally connected to the vehicle to be moved against the action of gravity to close the opening, means forming a keeper element carried by the vehicle, a reciprocable latch carried by the door for engagement with said keeper when the door is in closed position, an electro-magnet supported by the door and cooperatively associated with the latch to release the same upon energization, and circuit controlling means comprising a contact member carried by the vehicle and a second contact member having a station with respect to the path of movement of the vehicle to be momentarily engaged by the first contact when the vehicle reaches and passes a predetermined position in the path, said contact members being connected in series with the electro-magnet and source of potential and said electro-magnet being energized and releasing the latch upon engagement of the contact members one with the other.

2. A car having a body and wheel supported axles protective plates overlying the axles, doors each hingedly connected at one edge with a part of the body and movable against the action of gravity to closed position in which the opposite edge is disposed beneath a protective plate, a latch keeper disposed beneath and protected by each plate, a latch carried by each door adjacent the said opposite edge for engagement with a keeper to support the door in closed position, a magnet supported upon each door adjacent the latch and acting when energized to release the latch from its keeper, a protective housing carried by each door for the said latch and magnet, an electric contact for each magnet supported upon a side of the car and electrically connected with one side of the magnet, the other side of each magnet being electrically connected with a source of potential, and a contact supported for engagement by the car carried contacts upon movement of the car past a predetermined position, said second-mentioned contact being connected with said source of potential, said electro-magnets being energized for the release of the adjacent latches upon engagement of the car carried contacts with the said second contact.

3. The combination with a lading carrying car having a discharge opening and a gravity opened door controlling said opening, of an electro-magnetic actuated latch mechanism including a magnet, an armature and a latch element supported entirely upon the body of the door, a keeper forming a part of the body of the car with which the latch is engaged when the door is moved to closed position, an electric circuit including said electro-magnet and a source of potential, and a control switch for said circuit including a contact member carried on the outside of a side wall of the car and a contact member having a position adjacent to the path of travel of the car to be engaged by the first contact when the car reaches a predetermined position along said path to effect the momentary energization of the magnet and the retraction of the latch from the keeper.

4. The combination with a lading carrying car having a discharge opening and a gravity opened door controlling said opening, of an electro-magnetic latch mechanism including a magnet, an armature and a latch element supported entirely upon the body of the door, a keeper forming a part of the body of the car with which the latch is engaged when the door is moved to closed position, a lading receiving means over which the car passes when following a predetermined path of travel, an electric circuit having said electro-magnet and a source of potential therein, and a control switch for and in said circuit including a contact member carried on the outside of a side wall of the car and a second contact having a position adjacent the said path of travel of the car and adjacent said lading receiving means to be engaged by the first contact when said door is disposed in a predetermined position with respect to the receiving means to effect the momentary energization of the magnet and the release of the latch.

5. A drop bottom car, including a body having side walls and front and rear walls, wheel supporting axles for the body, front, rear and intermediate drop bottom doors for the car body, one of said drop bottom doors being hinged adjacent the one end wall of the car body, the other doors each being hinged adjacent an axle, a spring projected latch mounted upon a face of each drop bottom door and an electro-magnet associated with each latch for releasing the same and carried by said drop bottom door on the said face thereof, a protecting housing for each latch and its associated magnet and attached to the corresponding door, latch keeper plates carried by the body in position to be engaged by the latches of said doors, means carried by the car for protecting said keeper plates and the hinges of the doors from lading in the car, conductors connected to said magnets and extending to the outside of one side wall of the car, contacts carried by the said one side wall of the car one for each of said magnets and to which the respective conductors are connected, and a third rail with which said contacts are adapted to engage whereby the magnets are energized to retract the latches to release the several bottoms whereby the same may move to drop position.

6. An electro-magnetically controlled latch mechanism for releasing a drop bottom door in a vehicle through which lading in the vehicle will be discharged when the door is released by said mechanism, a circuit controlling means for effecting the energization of an electric circuit in which said electromagnetic latch is connected, said circuit being partly associated with the vehicle structure and partly associated with an apparatus at one side of the track where the vehicle passes and the said circuit being completed by contact between a part of the vehicle and part of the outside apparatus, and the said completion of the circuit causing the energization of the electro-magnetically controlled latch mechanism and release of said door whereby the door is opened by gravity so that the lading may be discharged by gravity through the said opening thus provided, and the entire electromagnetically controlled mechanism being a part of the structure of the said door whereby the said mechanism remains attached to the door during the opening and closing of the door.

7. A drop bottom car, including a body having side walls and front and rear walls, axles operatively engaged with the body intermediate the ends thereof and having wheels, front, rear and intermediate drop bottom doors operatively hinged each at its rear end to the car body, one of said drop bottom doors being hinged at its rear end adjacent the rear end wall of the car body spring-projected latches mounted upon the inner face of each drop bottom door and an electromagnet associated with each latch for retracting the same and carried by said drop bottom door on the inner face thereof, a lading protecting housing extending over each latch and its associated magnet and attached to the corresponding door, keeper plates extending over each axle and formed with keepers for the rear and intermediate doors, a keeper plate mounted at the forward end of the car and having a keeper coacting with the latch of the forward door, protective plates attached to the side walls of the car and extending over the axles and over the corresponding keeper plates and the hinges of the forward and intermediate doors, a protective plate extending downward from the front wall over the forward latch, a protective plate extending downward from the rear wall and over the hinge for the rear door, conductors connected to said magnets and extending out thru the side walls of the car, swingingly mounted contacts carried by one side wall of the car, one for each of said magnets and to which the respective conductors are connected, and a third rail with which said contacts are adapted to engage whereby the magnets are energized to retract the latches to release the several bottoms whereby the same may move to drop position.

ED W. DUNCAN.